(12) United States Patent
Fukui

(10) Patent No.: US 11,275,066 B2
(45) Date of Patent: Mar. 15, 2022

(54) LIQUID CHROMATOGRAPH

(71) Applicant: SHIMADZU CORPORATION, Kyoto (JP)

(72) Inventor: Wataru Fukui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 260 days.

(21) Appl. No.: 16/622,078

(22) PCT Filed: Sep. 14, 2017

(86) PCT No.: PCT/JP2017/033295
§ 371 (c)(1),
(2) Date: Dec. 12, 2019

(87) PCT Pub. No.: WO2019/053848
PCT Pub. Date: Mar. 21, 2019

(65) Prior Publication Data
US 2021/0190737 A1    Jun. 24, 2021

(51) Int. Cl.
*G01N 30/72* (2006.01)
*G01N 30/02* (2006.01)

(52) U.S. Cl.
CPC ... *G01N 30/7266* (2013.01); *G01N 2030/027* (2013.01)

(58) Field of Classification Search
CPC ......... G01N 30/7266; G01N 2030/027; G01N 2030/3084
See application file for complete search history.

(56) References Cited

U.S. PATENT DOCUMENTS

| | | | | |
|---|---|---|---|---|
| 4,440,550 A | * | 4/1984 | Jenkins | G01N 30/18 95/89 |
| 9,095,791 B2 | | 8/2015 | Prentice et al. | |
| 9,927,406 B1 | * | 3/2018 | Pierce | G01N 30/30 |
| 2008/0044309 A1 | * | 2/2008 | Yamashita | G01N 30/08 422/52 |
| 2018/0284080 A1 | * | 10/2018 | Narimatsu | G01N 30/24 |

(Continued)

FOREIGN PATENT DOCUMENTS

| | | |
|---|---|---|
| JP | 2008-021455 A | 1/2008 |
| JP | 2008-21455 A | 1/2008 |

(Continued)

OTHER PUBLICATIONS

Thermo Fisher Scientific Inc., "Thermo Scientific Dionex nanoViper Fingertight Fitting System," [online], [searched on Jul. 24, 2017], the Internet.

(Continued)

*Primary Examiner* — David J Bolduc
(74) *Attorney, Agent, or Firm* — Sughrue Mion, PLLC

(57) ABSTRACT

A liquid chromatograph that ionizes a sample eluted from a column 113 using an ionization probe 211 connected to the column 113 and analyzes the sample using an ion analyzer 200, the liquid chromatograph includes: a column oven 114 in which the column 113 is accommodated; and a guide mechanism 1, 1141a that is provided inside the column oven 114, permits the column 113 to move in a predetermined direction following movement of the ionization probe 211, and regulates movement in other directions.

4 Claims, 9 Drawing Sheets

(56) References Cited

U.S. PATENT DOCUMENTS

2018/0328898 A1* 11/2018 Hioki .................. G01N 30/7233
2018/0340918 A1* 11/2018 Sakai .................... G01N 30/68
2020/0158703 A1* 5/2020 Fukui ..................... H01J 49/10

FOREIGN PATENT DOCUMENTS

| TW | 539856 B | 7/2003 |
|---|---|---|
| WO | 99/50667 A1 | 10/1999 |
| WO | 2019/053847 A2 | 3/2019 |

OTHER PUBLICATIONS

GL Sciences Inc., "Column joint format" [online], [searched on Jul. 24, 2017], the Internet.

Written Opinion of the International Searching Authority of PCT/JP2017/033294 dated Dec. 19, 2017.

International Search Report of PCT/JP2017/033294 dated Dec. 19, 2017.

Thermo Fisher Scientific Inc., "Thermo Scientific Dionex nanoViper Fingertight Fitting System", [online], [searced on Jul. 24, 2017], the Internet URL:https://tools.thermofisher.com/content/sfs/brochures/114299-PS-70389-nanoViper-Fingertight-Fitting-System.pdf>.

GL Science Inc., "Column joint format" [online, searched on Jul. 24, 2017, the Internet.

Written Opinion of the International Searching Authority of PCT/JP2017/033294 dated Dec. 19, 2017 [PCT/ISA/237].

International Search Report of PCT/JP2017/033294 dated Dec. 19, 2017 [PCT/ISA/210].

Written Opinion of the International Searching Authority of PCT/JP2017/033295 dated Dec. 12, 2017 [PCT/ISA/237].

International Search Report of PCT/JP2017/033295 dated Dec. 12, 2017 [PCT/ISA/210].

Office Action dated Dec. 9, 2021 in Chinese Application No. 201780093794.2 English Translation.

* cited by examiner

LIQUID CHROMATOGRAPH

CROSS REFERENCE TO RELATED APPLICATIONS

This application is a National Stage of International Application No. PCT/JP2017/033295, filed on Sep. 14, 2017.

TECHNICAL FIELD

The present invention relates to a liquid chromatograph including an ion analyzer as a detector.

BACKGROUND ART

A liquid chromatograph is widely used as an apparatus that analyzes a component contained in a liquid sample. In the liquid chromatograph, the liquid sample is introduced into a column on a flow of a mobile phase, and various components contained in the liquid sample are temporally separated, and measured with a detector. The liquid chromatograph including a mass spectrometer as the detector is called a liquid chromatograph mass spectrometer. In the liquid chromatograph mass spectrometer, various components sequentially eluted from a liquid chromatograph column are ionized by introducing the various components into the ionization probe of the mass spectrometer, and the generated ions are measured in each mass-to-charge ratio.

In the liquid chromatograph mass spectrometers, recently what is called nano-ESI or micro-ESI is widely used to measure a very small amount of components contained in a sample with high sensitivity. In the nano-ESI or the micro-ESI, a small-diameter column is used, and the amount of eluate per unit time introduced into the ionization probe is suppressed by controlling a flow rate of the mobile phase from a nL/min level to a μL/min level, which allows ionization efficiency to be increased by increasing charging efficiency or facilitating the solvent removal.

In many liquid chromatograph mass spectrometers, a flow path on an outlet side of the column and a flow path on an inlet side of the ionization probe are connected to each other by a dedicated jig (for example, Non Patent Literature 1). The flow path on the outlet side of the column and the flow path on the inlet side of the ionization probe are connected to each other by a minimum length of piping because diffusion of each component increases in the flow path with increasing flow path. When the flow rate of the mobile phase is kept low as described above, each component separated by the column is easily diffused only by existence of a slight space (dead volume) in the piping after the column. For example, when the dead volume exists in the flow path between the outlet of the column and the inlet of the ionization probe, components diffuse due to the dead volume. There has also been proposed a technique in which the column and the ionization probe of the liquid chromatograph are integrated and the dead volume is eliminated by directly connecting the outlet of the column and the inlet of the ionization probe (for example, Patent Literature 1).

In the liquid chromatograph, when a pump that feeds the mobile phase vibrates, or when the column vibrates due to accidental touch of the user with the piping or due to an air flow generated by heat circulation in a column oven, undesired desorption of a component of the sample occurs in the column, or undesired diffusion of the separated component occurs in the flow path on the outlet side of the column. For this reason, in many of the conventionally-used liquid chromatographs, the column is fixed in the column oven to prevent the undesired vibration of the column.

In the mass spectrometer, in order to detect a measurement target component with high sensitivity, disposition (position and orientation) of the ionization probe is adjusted with respect to an ion introduction opening, which is an opening introducing ions into an analysis chamber, before the measurement of the sample is actually started. The optimal disposition of the ionization probe varies depending on the characteristic (such as the efficiency of ionization) of the measurement target component, a flow rate of the mobile phase, and the like. For this reason, for example, the user introduces a standard substance having the same or similar characteristic as the component of the measurement target into the ionization probe under the same conditions as the actual measurement of the sample, performs preliminary measurement such as measurement of intensity of ions derived from the standard substance while changing the disposition of the ionization probe little by little, and determines the disposition at which the measured intensity of ions is maximized as the optimum disposition of the ionization probe.

CITATION LIST

Patent Literature

Patent Literature 1: U.S. Pat. No. 9,095,791 B

Non Patent Literature

Non Patent Literature 1: Thermo Fisher Scientific Inc., "Thermo Scientific Dionex nanoViper Fingertight Fitting System", [online], [searched on Jul. 24, 2017], the Internet

SUMMARY OF INVENTION

Technical Problem

When, in performing the preliminary measurement using the conventional liquid chromatograph, the ionization probe is moved in the direction opposite to the column in order to adjust the disposition (position and orientation) of the ionization probe, the column connected to the ionization probe and the column oven to which the column is fixed are also pulled. The column oven is a heavy object including a heat source. On the other hand, the piping on the inlet side of the ionization probe is a thin tube having an outer diameter of, for example, several hundred micrometers. For this reason, when the ionization probe is moved, the heavy column oven is pulled via the inlet-side piping of the ionization probe and the column (that is, the column oven moves as the ionization probe moves), sometimes the inlet-side piping of the ionization probe and column are damaged by a large force, or the connection between the inlet-side piping and the column fails. In particular, when the length of the inlet-side piping of the ionization probe is required to be minimized in the nano ESI or the micro ESI in order to prevent the diffusion of the component separated by the column in the piping, the above problem markedly occurs even when the adjustment of the ionization probe is small because there exists little allowance that the piping can absorb the force during the movement of the ESI probe. Even if the ionization probe and the column are integrally formed, the column oven is pulled by the column integrated with the ionization probe when the position of the ionization probe is adjusted, and sometimes the column is damaged.

The problem to be solved by the present invention is to provide a liquid chromatograph that can adjust the disposition of the ionization probe connected to the column set in the column oven without moving the column oven while suppressing the undesired vibration of the column in the column oven.

Solution to Problem

According to an aspect of the present invention, which solves the problem, a liquid chromatograph configured to ionize a sample eluted from a column using an ionization probe connected to the column and to analyze the sample using an ion analyzer, the liquid chromatograph includes:

a) a column oven in which the column is accommodated; and b) a guide mechanism provided inside the column oven, and configured to allow the column to move in a predetermined direction following movement of the ionization probe, and to restrict movement in other directions.

The predetermined direction is a direction corresponding to the direction in which the disposition (position and orientation) of the ionization probe connected to the column is adjusted. Typically the adjustment of the disposition of the ionization probe is parallel translation in the longitudinal direction of the ionization probe, and the predetermined direction is the longitudinal direction of the column in a general configuration in the nano-ESI and micro-ESI in which the longitudinal direction of the ionization probe and the longitudinal direction of the column are connected to each other so as to be matched with each other.

In the liquid chromatograph of the present invention, the column connected to the ionization probe included in the ion analyzer is accommodated in the column oven. The guide mechanism allows the column accommodated in the column oven to follow the movement of the ionization probe to move in the predetermined direction. In the liquid chromatograph of the present invention, only the column and the guide mechanism move with the ionization probe when the disposition of the ionization probe is adjusted, and the heavy column oven does not move. Consequently, the large force is not applied to the inlet-side piping of the ionization probe unlike the conventional technique, and a possibility of damaging the pipe is reduced. Because the movement of the column in a direction other than the predetermined direction is restricted, generation of the undesired vibration in the column due to the vibration of the pump or the like is prevented. In the conventional liquid chromatograph, it is necessary to provide the space allowing the movement of the column oven, which is a component larger than the ionization probe or the column, in the inside of the apparatus or the column oven installation space. In contrast it is not necessary to provide such a space in the liquid chromatograph of the present invention, and the apparatus can be made smaller than before.

Advantageous Effects of Invention

By using the liquid chromatograph according to the present invention, the disposition of the ionization probe connected to the column set in the column oven can be adjusted without moving the column oven while the undesired vibration of the column is prevented in the column oven.

DESCRIPTION OF EMBODIMENTS

A liquid chromatograph according to an embodiment of the present invention will be described below with reference to the drawings. The liquid chromatograph of the embodiment is a liquid chromatograph mass spectrometer including a mass spectrometer as a detector.

Figure 1:
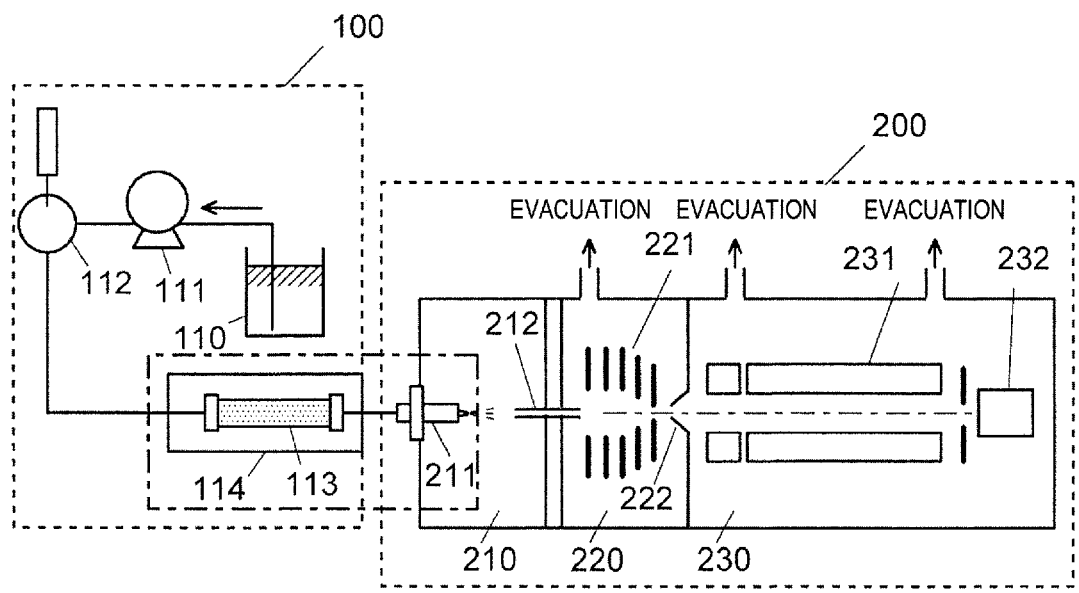
FIG. 1 is a configuration diagram illustrating a main part of a liquid chromatograph mass spectrometer that is a liquid chromatograph according to an embodiment of the present invention.

FIG. 1 illustrates a configuration of a main part in the liquid chromatograph mass spectrometer of the embodiment.

The liquid chromatograph mass spectrometer of the embodiment roughly includes a liquid chromatograph 100 and a mass spectrometer 200, and operation of each unit is controlled by a controller (not illustrated). The liquid chromatograph 100 includes a mobile phase container 110 in which a mobile phase is stored, a pump 111 that sucks the mobile phase and delivers the mobile phase at a constant flow rate, an injector 112 that injects a predetermined amount of liquid sample into the mobile phase, and a column 113 that separates various compounds contained in the liquid sample in a time direction, and a column oven 114 that controls a temperature of the column 113. An autosampler (not illustrated) that introduces a plurality of liquid samples into the injector 112 one by one is provided.

The mass spectrometer 200 has a configuration of a differential evacuation system including an ionization chamber 210 that is substantially atmospheric pressure, and an intermediate vacuum chamber 220 and a high-vacuum analysis chamber 230 which are evacuated by a vacuum pump (not illustrated). An electrospray ionization probe (ESI probe) 211 that nebulizes the sample solution while applying a charge to the sample solution is provided in the ionization chamber 210. The ionization chamber 210 and the subsequent-stage intermediate vacuum chamber 220 communicate with each other through a small-diameter heating capillary 212. An ion guide 221 that transports ions to the subsequent stage while converging the ions is provided in the intermediate vacuum chamber 220, and the intermediate vacuum chamber 220 and the analysis chamber 230 are separated from each other by a skimmer 222 including a small hole at the top. A quadrupole mass filter 231 and an ion detector 232 are installed in the analysis chamber 230. In the embodiment, the mass spectrometer is a simple quadrupole type. However, a mass spectrometer having another configuration (such as a triple quadrupole type and an ion trap-time-of-flight type) may be used.

The mass spectrometer 200 can perform SIM (selected ion monitoring) measurement and MS scan measurement. In the SIM measurement, ions are detected while a mass-to-charge ratio of ions passing through the quadrupole mass filter 231 is fixed. In the MS scan measurement, ions are detected while the mass-to-charge ratio of ions passing through the quadrupole mass filter 231 is scanned.

One of the features of the liquid chromatograph of the embodiment is that an ionization probe connection jig 1 described below is used to connect an outlet-side piping of the column 113 accommodated in the column oven 114 and an inlet-side piping 211a of an ESI probe 211, whereby the column 113 to which the inlet-side piping 211a of the ESI probe 211 is connected is movable in the column oven 114.

The ionization probe connection jig 1 used in the embodiment is used to connect an outlet-side flow path of the column 113 and an inlet-side flow path of the ESI probe 211 in a region indicated by an alternate long and short dash line in FIG. 1.

The components of the ionization probe connection jig 1 of the embodiment will be described. The ionization probe connection jig 1 of the embodiment roughly includes an adapter 10, a probe fixture 20, a housing 30 (see FIGS. 6A and 6B), and a pressing mechanism 40 (see FIGS. 7A to 7C). In order to efficiently control the temperature of the column 113 in the column oven 114, each of the adapter 10, the housing 30, and the pressing mechanism 40 is made of a metal (such as aluminum) having high thermal conductivity. The probe fixture 20 is made of stainless steel (SUS) or the like.

Figure 2:
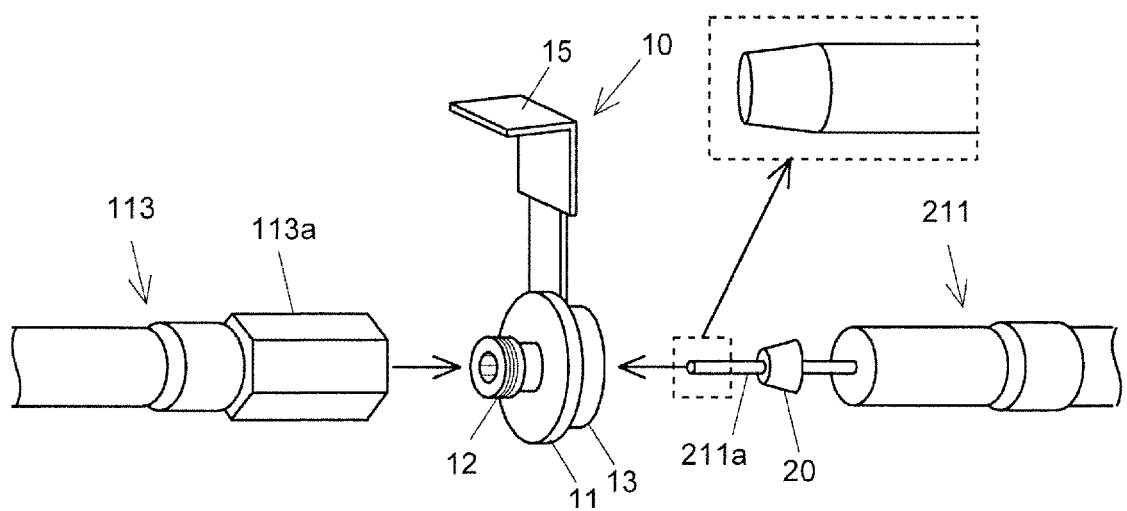
FIG. 2 is a schematic configuration diagram illustrating an adapter of the embodiment.

As illustrated in FIG. 2, the adapter 10 includes a disk-shaped flange 11, a column fixation section 12 provided on one (a surface on the side of the column 113) of surfaces of the flange 11, and a probe connection unit 13 provided on the other surface of the flange 11 (the surface on the side of the ESI probe 211). These units constitute a main body of the adapter 10.

Figure 3A:
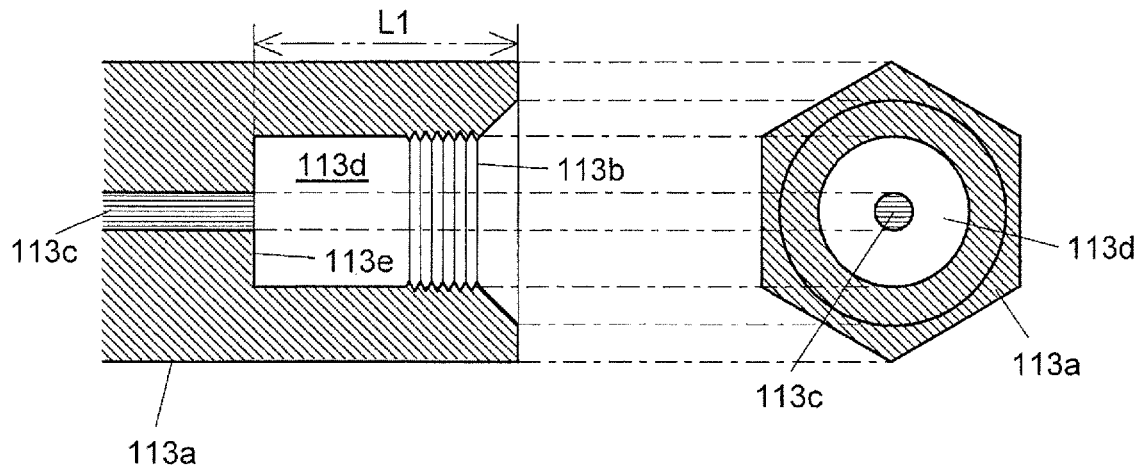
FIGS. 3A and 3B are sectional views illustrating a column connection unit of the embodiment.
Figure 3B:
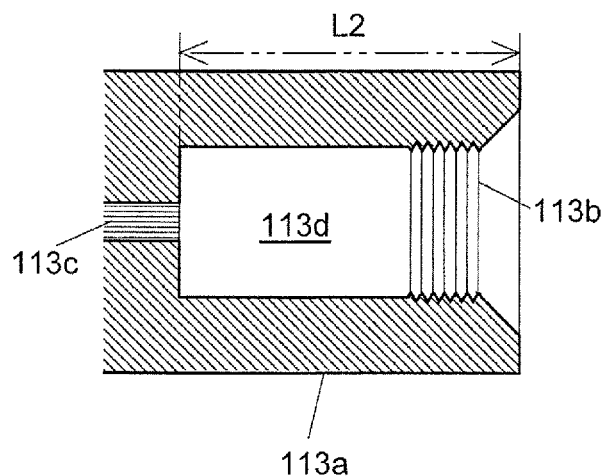

FIG. 3A illustrates a structure of a connection unit 113a of the column 113. The left of FIG. 3A is a sectional view, and the right of FIG. 3A is a view in which the connection unit 113a is viewed from the side of the ionization probe 211. An outlet-side flow path 113c of the column 113 is formed on one end side in the connection unit 113a of the column 113. A connection space 113d is provided ahead of the outlet-side flow path 113c, and a thread (female screw) 113b conforming to a unified screw standard is formed in a part of the inner peripheral surface of the connection space 113d. A surface perpendicular to a longitudinal direction (axial direction) of the column 113 at the end of the outlet-side flow path 113c of the column 113 constitutes a piping abutment surface 113e, and the piping abutment surface 113e abuts on an end face of an inlet-side piping 211a of the ionization probe 211 and is connected to the outlet-side flow path 113c of the column 113 in the face abutment manner. The shape of the connection unit 113a varies depending on the type of the column 113, and a length of the connection space 113d (L1, L2 described in FIGS. 3A and 3B) also varies. The thread 113b is common regardless of the type of the column 113. In the following description, the term "axial direction" means the longitudinal direction of the column 113. In the embodiment, because the column 113 and the ESI probe 211 are coaxially disposed, the term "axial direction" is an axial direction common to both the column 113 and the ESI probe 211. The term "coaxial" is a feature in the embodiment, and it is not always necessary that both axes be set to a common direction.

Figure 4:
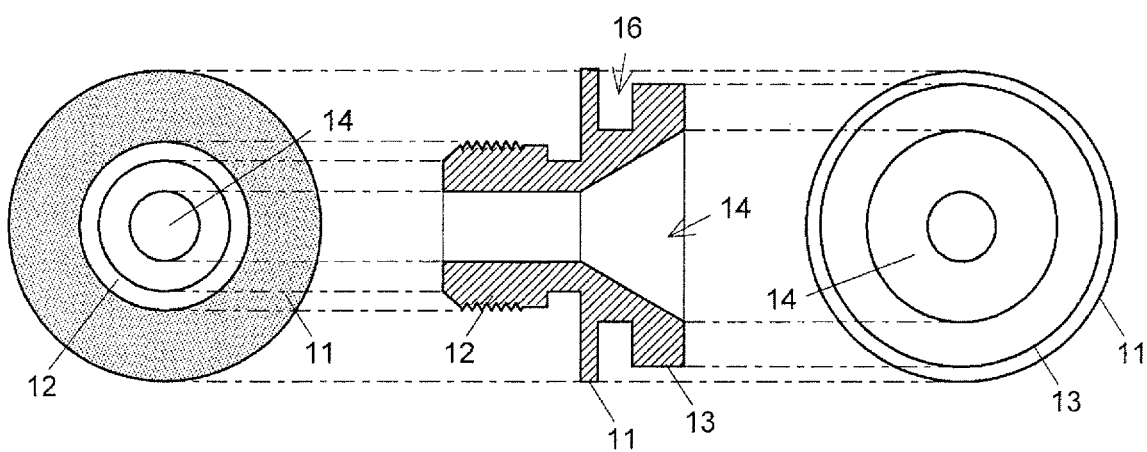
FIG. 4 is a view illustrating a shape of a main body of the adapter of the embodiment.

A thread (male thread) corresponding to the unified screw standard (the shape of the thread 113b formed in the inner peripheral surface of the connection space 113d of the connection unit 113a of the column 113) is also provided in the outer peripheral surface of the column fixation section 12. FIG. 4 is a view illustrating the configuration of the main body of the adapter 10, the center of FIG. 4 is a sectional view, the left of FIG. 4 is a view seen from the side of the column 113, and the right of FIG. 4 is a view seen from the side of the ESI probe 211. A through-hole 14 is made in the main body of the adapter 10 so as to pierce in the axial direction (the longitudinal direction of the column 113). The through-hole 14 extends from the flange 11 to the probe connection unit 13 in a tapered shape toward the side of the ESI probe 211.

Figure 5:
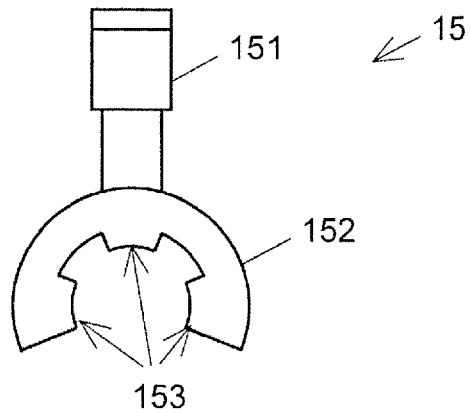
FIG. 5 is a schematic configuration diagram illustrating an operation member of the adapter of the embodiment.

As illustrated in FIG. 5, an operation member 15 is one in which a C-shaped ring 152 is formed at a leading end of an L-shaped handle 151, and protrusions 153 are provided at three points in the inner peripheral surface of the ring 152. The main body of the adapter 10 is held so as to be rotatable about the axis by inserting the three protrusions 153 of the operation member 15 into a recess 16 (see FIG. 4) between the flange 11 and the probe connection unit 13 of the adapter 10.

The probe fixture 20 is a truncated cone-shaped member in which a through-hole is made in order to insert the inlet-side piping 211a of the ESI probe 211. As illustrated in an enlarged view on the upper right of FIG. 2, the end of the inlet-side piping 211a of the ESI probe 211 is formed in a tapered shape, and the probe fixture 20 is attached to the inlet-side piping 211a.

Figure 6A:
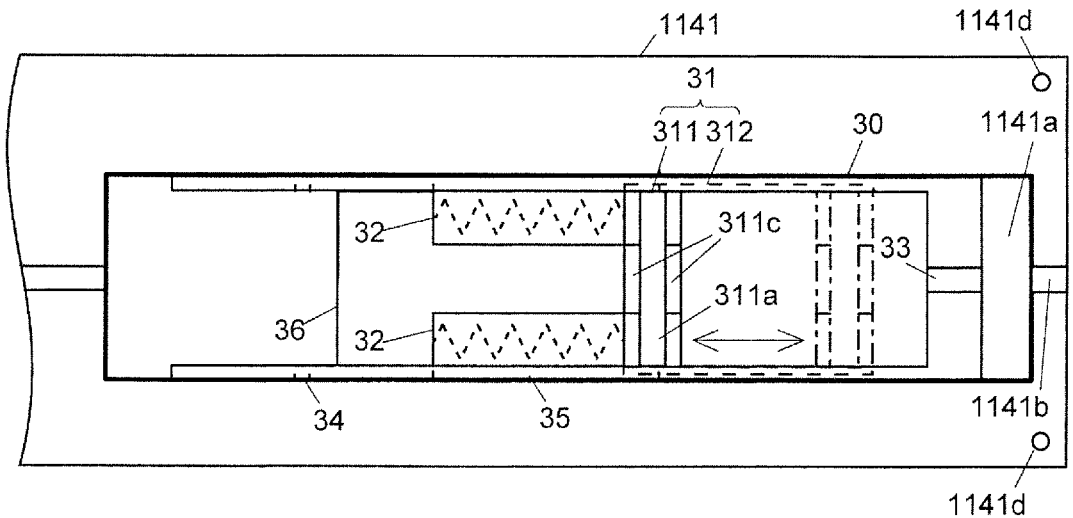
FIGS. 6A and 6B are schematic configuration diagrams illustrating a casing of the embodiment.
Figure 6B:
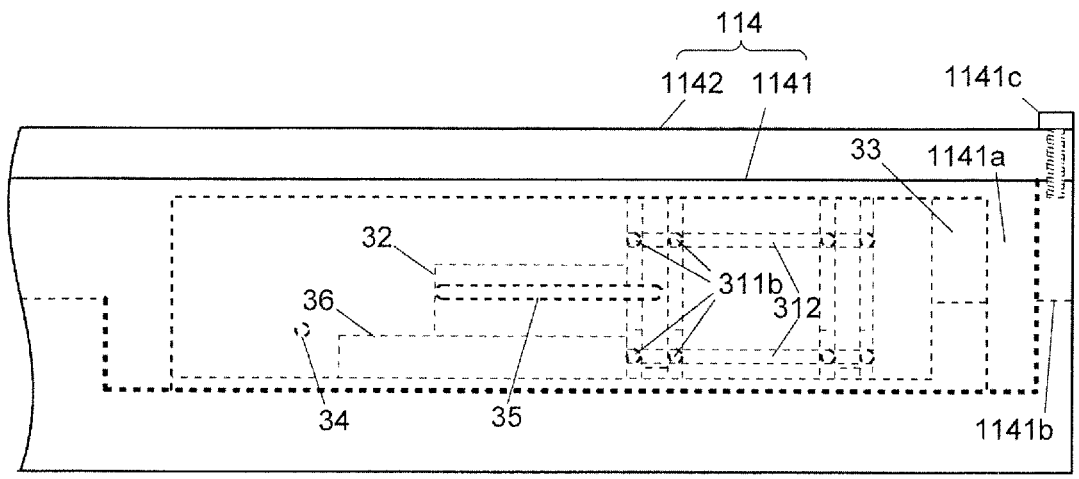

FIG. 6A is a schematic diagram illustrating a state in which the housing 30 is attached to the column oven 114 as seen from above, and FIG. 6B is a schematic diagram illustrating the same state as seen from the side. The column oven 114 includes a column oven body 1141 that is a rectangular parallelepiped casing in which a top surface is open and a lid 1142 that covers the top surface of the column oven body 1141. However, FIG. 6A illustrates a state in which the lid 1142 is removed in order to easily understand the configuration of the housing 30 in the column oven body 1141. A recess 1141a (a portion surrounded by a thick line) that accommodates the housing 30 such that the housing 30 is movable in the axial direction (that is, longer than a length in the axial direction of the housing 30) is formed in the column oven body 1141, and a recess 1141b open upward is formed in the side surface on the side of the ESI probe 211. A size (a diameter of a section perpendicular to the axis of the hole) of the recess 1141b is slightly larger than an outer diameter of the inlet-side piping 211a of the ESI probe 211, and the inlet-side piping of the ESI probe 211 is loosely fitted in the recess 1141b. A screw hole 1141d into which a screw 1141c is inserted in attaching the lid 1142 is made at a corner of the column oven body 1141.

The housing 30 is a rectangular parallelepiped casing in which an upper surface and a surface on the side into which the column 113 is inserted are open. An adapter attaching unit 31, a pressing mechanism accommodating unit 32, and a column mounting unit 36 are provided in the housing 30.

The adapter attaching unit 31 includes an adapter accommodating unit 311 including a protrusion 311*b* in an outer surface in which a slot 311*a* having a shape corresponding to an outer shape of the flange 11 of the adapter 10 is formed and an adapter accommodating unit holder 312 that has a rail into which the protrusion 311*b* is inserted and movably holds the adapter accommodating unit 311 between a position indicated by a solid line in FIG. 6A and a position indicated by an alternate long and short dash line in FIG. 6A. A recess 311*c* in which the top is open is formed in two sidewalls located on both sides of the slot 311*a*, the connection unit 113*a* of the column 113 is disposed in the recess 311*c* of one sidewall, and the probe connection unit 13 of the adapter 10 is disposed in the recess 311*c* of the other sidewall.

Two pressing mechanism accommodating units 32 that are integrally formed with the adapter accommodating unit 311 and move in the axial direction together with the adapter accommodating unit 311 are provided on both sides of the position in which the column 113 is accommodated. Each of the two pressing mechanism accommodating units 32 accommodates a spring 44 included in each of two pressing mechanisms 40 (to be described later).

An ionization probe accommodating unit 33 that is the recess opened upward is formed in a side surface of the housing 30 on the side to which the ESI probe 211 is attached. The size (the diameter of the section perpendicular to the axis of the hole) of the recess is the same as that of an ionization probe accommodating unit 1141*b* formed in the column oven body 1141, and is slightly larger than the inlet-side piping 211*a* of the ESI probe 211, and therefore the inlet-side piping 211*a* is loosely fitted in the long hole. The size of the recess is smaller than an outer diameter of a bottom surface (the surface located on the opposite side to the column 113, the truncated cone-shaped bottom surface) of the probe fixture 20. Thus, when the ESI probe 211 to which the probe fixture 20 is attached is retracted by a predetermined distance, the probe fixture 20 (the truncated cone-shaped bottom surface) abuts on the inner wall surface around the ionization probe accommodating unit 33 of the housing 30, and the further retreat of the ESI probe 211 (the retreat beyond the predetermined position) is regulated. In the description of the embodiment, the term "advance" of the column 113 and the ESI probe 211 means movement of one side toward the other side, and the term "retreat" means movement in the opposite direction.

A circular hole 34 restricting the movement of the pressing mechanism 40 (to be described later) and a long hole 35 extending in the axial direction are made in each of two side surfaces (two side surfaces parallel to the axial direction) of the housing 30 (a total of four holes on the two side surfaces). The hole 34 is made at a position lower than the column 113, and the long hole 35 is made at the same height as the column 113. A column mounting unit 36 that supports the accommodated column 113 from below is formed in the bottom of the housing 30. A height of the column mounting unit 36 may appropriately be changed according to the size of the column 113. The adapter accommodating unit 311 and the column mounting unit 36 may be integrated.

Figure 7A:
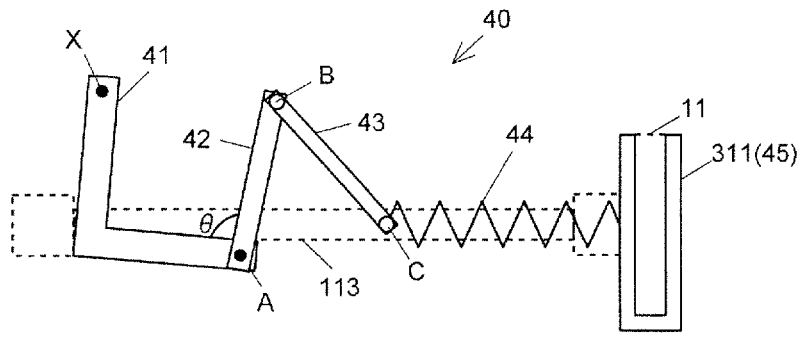
FIGS. 7A to 7C are views illustrating a configuration of the operation member of the embodiment.

FIG. 7A illustrates a schematic configuration of the pressing mechanism 40. The pressing mechanism 40 is a member accommodated in the housing 30, and is disposed on both sides of the column 113. Each of the two pressing mechanisms 40 includes an L-shaped arm 41, a rod-shaped first connection member 42 in which one end is fixed to a connection point A at the leading end of the arm 41 at an angle θ (θ>90 degrees), a rod-shaped second connection member 43 in which one end is rotatably fixed to a connection point B at the other end of the first connection member 42, a spring (elastic member) 44 connected to a connection point C at the other end of the second connection member 43, and a pressing unit 45. The pressing unit 45 of the pressing mechanism 40 is the same component as the adapter accommodating unit 311. As in another aspect (to be described later), a plate-shaped member attached to the spring 44 can be used as the pressing unit 45. That is, the arm 41, the first connection member 42, the second connection member 43, the spring 44, and the pressing unit 45 (adapter accommodating unit 311) are connected in this order. In the pressing mechanism 40, the spring 44 is connected to the adapter accommodating unit 311. Because the flange 11 of the adapter 10 is accommodated in the slot 311*a* of the adapter accommodating unit 311, when the adapter accommodating unit 311 is moved by the pressing mechanism 40, the adapter 10 also moves simultaneously in the same direction, and the column 113 fixed to the column fixation section 12 of the adapter 10 also moves in the same direction. The pressing mechanism 40 in FIG. 7A includes the arm 41, the first connection member 42, the second connection member 43, the spring 44, and the adapter accommodating unit 311 illustrated by solid lines in FIG. 7A. Similarly, in FIGS. 7B and 7C, members constituting the pressing mechanisms 40*a*, 40*b* are indicated by solid lines, and other members are indicated by broken lines.

Figure 7B:
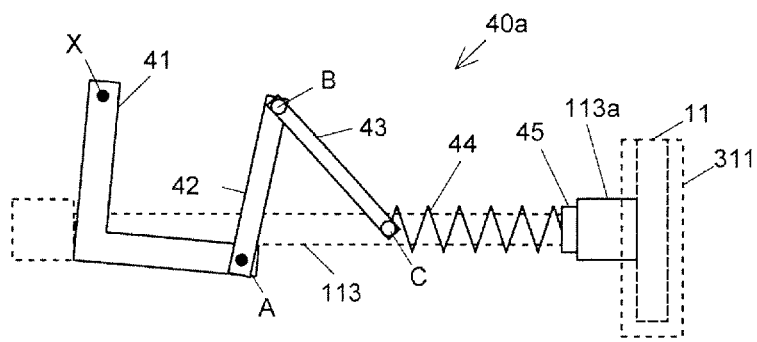
Figure 7C:
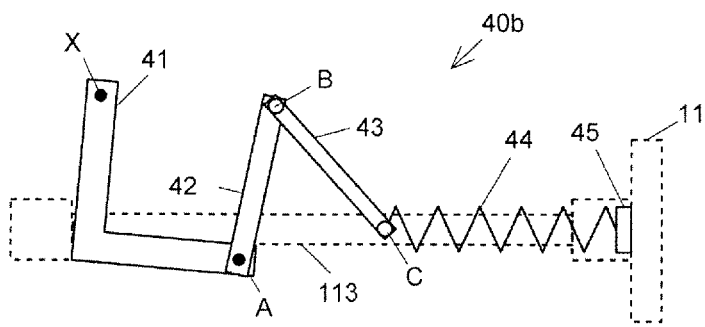

The pressing mechanism 40 can take various forms except for the form in FIG. 7A. FIGS. 7B and 7C illustrate example of the pressing mechanism.

In a pressing mechanism 40*a* in FIG. 7B, a plate-shaped pressing unit 45 is attached to the end of the spring 44, and the pressing unit 45 abuts on the connection unit 113*a* of the column 113 (a portion extending to the outside of the outer diameter of the column 113). The shape of the column 113 varies depending on the type of the column, but the column 113 is pressed by the pressing mechanism 40*a* in FIG. 7B so as to advance when the column 113 has a region that can be pressed by the pressing mechanism 40*a*.

A pressing mechanism 40*b* in FIG. 7C is an example that is used when the housing 30 does not include the adapter accommodating unit 311. In the pressing mechanism 40*b*, the pressing unit 45 attached to the end of the spring 44 is attached to a region (pressable region 11*a*, see FIG. 8) outside the outer diameter of the connection unit 113*a* of the column 113 in the flange 11 of the adapter 10. The pressing mechanism 40*b* presses the outside region of the flange 11 to advance the adapter 10 and the column 113.

As illustrated in FIGS. 7A to 7C, the pressing mechanism 40 (40*a*, 40*b*) can only apply the force to advance the column 113 in the axial direction, and any appropriate configuration can be adopted as long as the pressing mechanism 40 (40*a*, 40*b*) has the function. In other words, the pressing mechanism 40 may directly press the adapter 10 (the first element fixture), press the column 113 (the first element) to press the adapter 10 fixed to the column 113, or press the adapter accommodating unit 311 to press the adapter 10 accommodated in the slot 311*a* of the adapter accommodating unit 311 (that is, indirectly press the adapter 10). The pressing mechanism 40 described with reference to FIG. 7A is used in each of the embodiments (FIGS. 6A and 6B, FIGS. 9A to 9C, and FIGS. 13A to 13C) described in the description.

Figure 8:
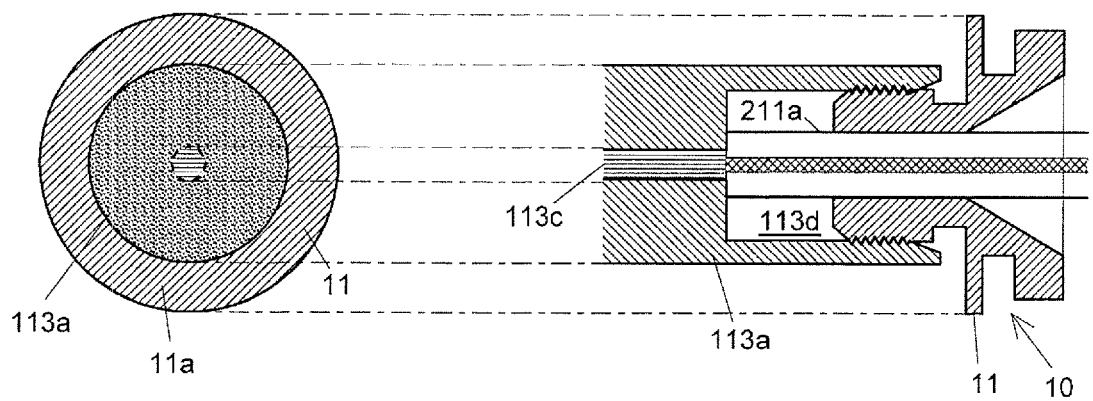
FIG. 8 is a view illustrating a state in which the column connection unit and an inlet-side piping of an ESI probe are connected to the adapter of the embodiment.

FIG. 8 illustrates the configuration of the flange 11 with the column fixation section 12 attached. The left of FIG. 8 is a sectional view, and the right of FIG. 8 is a view seen from the side of the column 113. As illustrated in the left of FIG. 8, the flange 11 includes a pressable region 11a extending to the outside from the outer diameter of the connection unit 113a of the column 113. As described above, in the embodiment, the pressing mechanism 40 in FIG. 7A is used. Alternatively, the pressing mechanism 40b in FIG. 7C may be used to press the pressable region 11a. Hereinafter, advantages of the adapter 10 of the embodiment will be described when the pressing mechanism 40 in FIG. 7A or the pressing mechanism 40b in FIG. 7C is used.

Because the shape of the column 113 varies depending on the column type, sometimes the region that can be pressed by the pressing unit 45 of the pressing mechanism 40a does not exist in the connection unit 113a (that is, the pressing mechanism 40a in FIG. 7B cannot be used). On the other hand, the adapter 10 of the embodiment includes the flange 11 having the pressable region 11a, so that the pressing unit 45 (adapter accommodating unit 311) of the pressing mechanism 40 in FIG. 7A or the pressing unit 45 of the pressing mechanism 40b in FIG. 7C can abut on the pressable region 11a of the flange 11 to provide the force that advances the column 113 even in the column 113 in which the connection unit 113a does not have the region that can be pressed by the pressing mechanism 40a.

The flange 11 of the embodiment is the disk shape, but the flange 11 does not necessarily have the disk shape. The flange 11 may have another shape as long as the flange 11 has the pressable region 11 a on a periphery edge (outside) of the column fixation section 12. However, when the disk-shaped flange 11 of the embodiment is used, even if the main body of the adapter 10 is rotated and accommodated in the slot 311a of the housing 30 in order to eliminate the twist of the inlet-side piping of the column 113, the flange 11 can certainly be pressed by the pressing unit 45 (adapter accommodating unit 311) of the pressing mechanism 40 in FIG. 7A or the pressing unit 45 of the pressing mechanism 40b in FIG. 7C.

For the above reasons, preferably the flange 11 has the pressable region 11a extending outside the outer shape over the entire length of the column 113 about the longitudinal axis of the column 113 as in the embodiment. Consequently, as illustrated in the left of FIG. 8, the pressable region 11a of the flange 11 can be seen from a rear (an upstream side from the outlet end of the column 113) of the column 113, the shape of the pressing unit 45 pressing the flange 11 from the rear of the column 113 can be simplified (for example, a simple plate member). The length of the inlet-side piping 211a of the ionization probe located on a downstream side of the outlet of the column 113 can be minimized because the pressing mechanisms 40, 40b can be provided behind the column 113.

As illustrated in FIG. 7A, in the pressing mechanism 40 of the embodiment, the connection point A between the arm 41 and the first connection member 42 is located below the column 113. One first coupling member 46 pierces through the arm 41 and the first connection member 42 disposed on both the sides of the column 113, and both the ends of the first coupling member 46 (see FIGS. 9A to 9C) are attached to the hole 34 made in the side surface of the housing 30. Consequently, the position of the connection point A is fixed. The second connection member 43 and the spring 44 are coupled together at the connection point C, and the second coupling member 47 (see FIGS. 9A to 9C) is attached to the long hole 35 made in the side surface of the housing 30 so as to be movable only in the axial direction. The connection point B between the first connection member 42 and the second connection member 43 moves to an appropriate position according to the operation of the arm 41, the first connection member 42, and the second connection member 43.

Figure 9A:
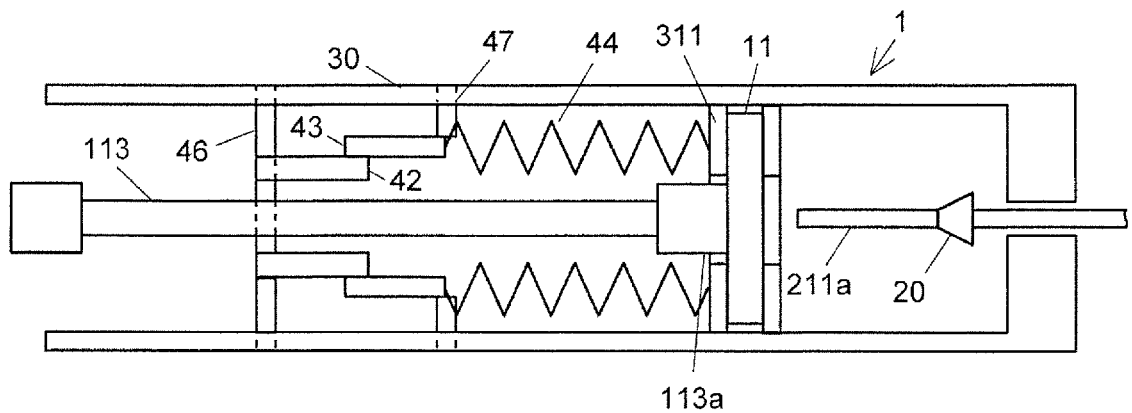
FIGS. 9A to 9C are views illustrating arrangement of components and operation procedure of an ionization probe connection jig of the embodiment.
Figure 9B:
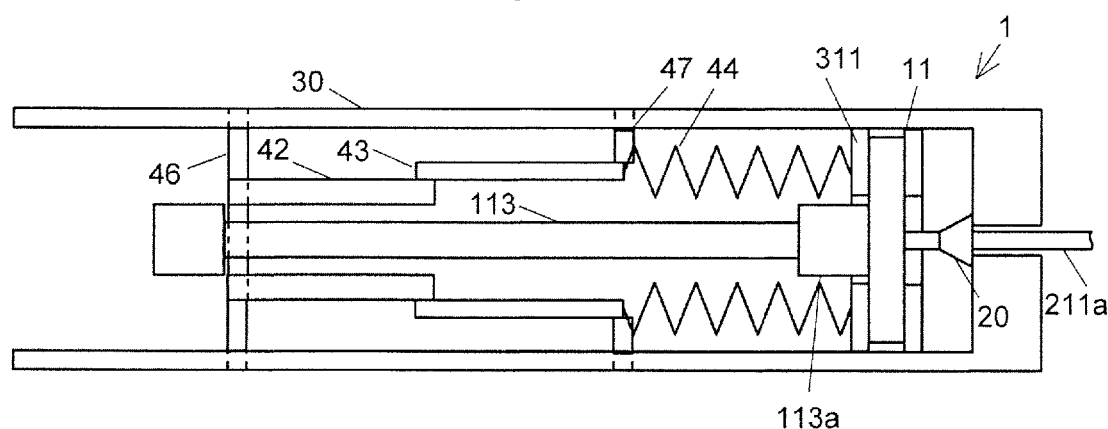
Figure 9C:
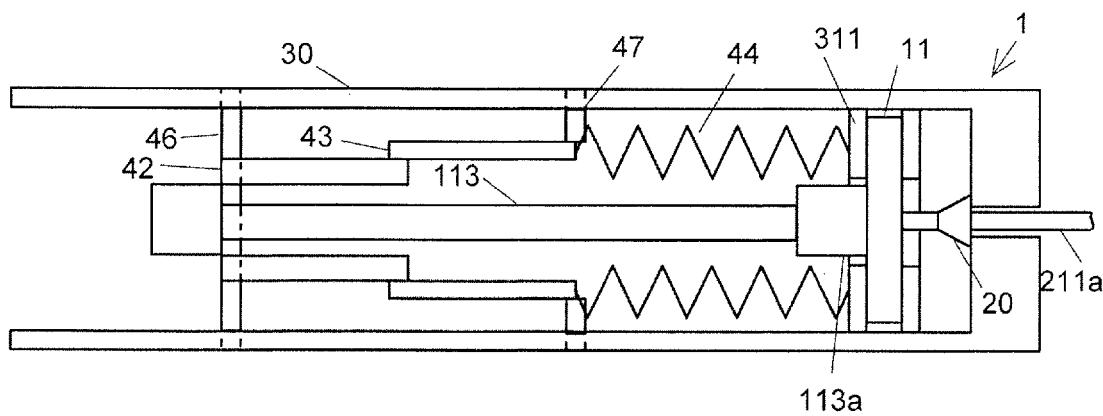
Figure 10A:
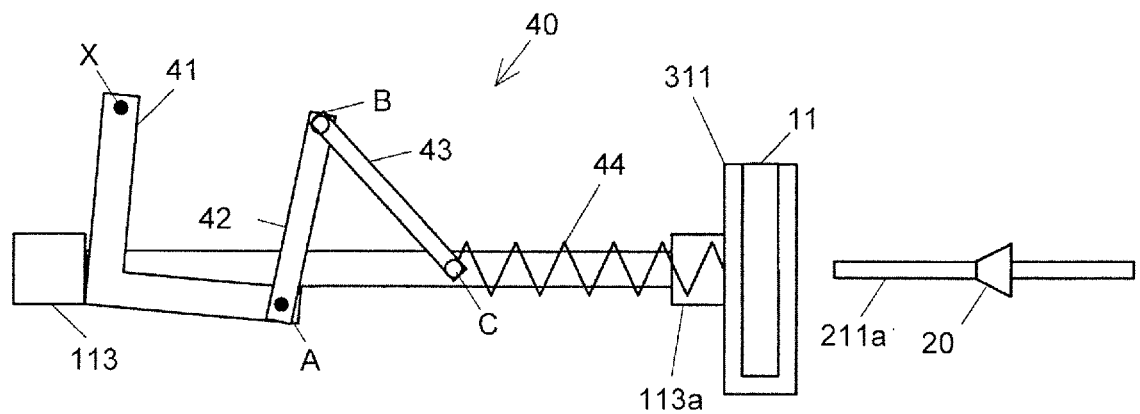
FIGS. 10A to 10C are other views illustrating the operation procedure of the ionization probe connection jig of the embodiment.
Figure 10B:
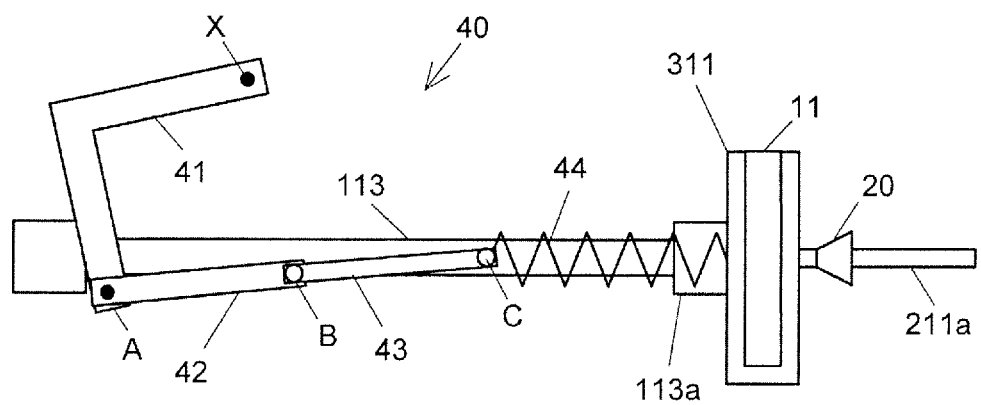
Figure 10C:
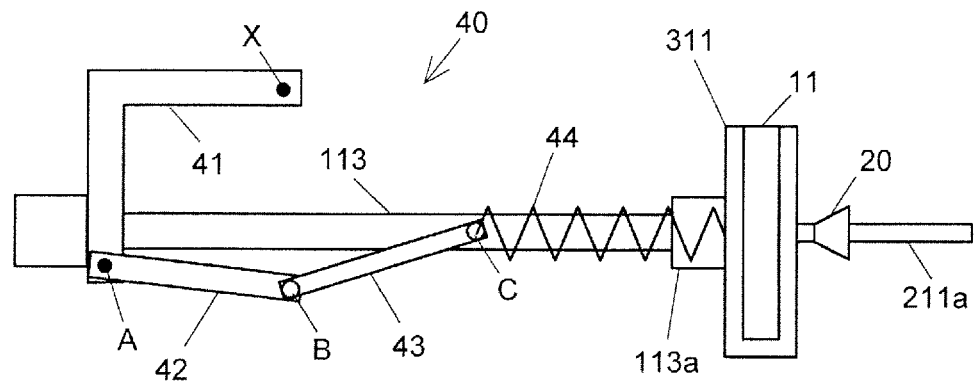

An operation procedure for connecting the inlet-side piping 211a of the ESI probe 211 to the outlet-side flow path of the column 113 using the ionization probe connection jig 1 of the embodiment will be described with reference to FIGS. 9A to 10C. FIGS. 9A to 9C are views illustrating disposition of a main part as seen from above the housing 30, and FIGS. 10A to 10C are views illustrating the disposition of the main part as seen from the side surface. The shape of the adapter 10 is as illustrated in FIGS. 4 and 6, but only the flange 11 is illustrated by simplifying the adapter 10 in FIGS. 9A to 10C. The arm 41 is omitted in FIGS. 9A to 9C in order to illustrate the position of each unit of the pressing mechanism 40 in an easy-to-understand manner.

During the use of the ionization probe connection jig 1 of the embodiment, the connection unit 113a of the column 113 is fixed to the column fixation section 12 of the adapter 10. As described above, this is performed by screwing the thread 113b formed on the inner peripheral surface of the connection unit 113a with the thread of the column fixation section 12 of the adapter 10. The adapter 10 is held by the operation member 15, and the flange 11 of the adapter 10 is accommodated in the slot 311a of the adapter accommodating unit 311.

Subsequently, the probe fixture 20 is attached to the inlet-side piping 211a of the ESI probe 211, and the inlet-side piping 211a is placed in the ionization probe accommodating unit 33 of the housing 30 and the ionization probe accommodating unit 1141b of the column oven body 1141 such that the probe fixture 20 is located in the housing 30 (the inlet-side piping 211a is loosely fitted in both the recesses). The attaching position of the probe fixture 20 is set in consideration of the moving distance of the ESI probe 211 during an operation (to be described later) because the attaching position of the probe fixture 20 defines the retractable distance of the ESI probe 211. The disposition of each unit at this time is as illustrated in FIGS. 9A and 10A.

Subsequently, when the user operates the handle to tilt the arms 41 of the two pressing mechanisms 40, the angle formed by the first connection member 42 and the second connection member 43 gradually increases and approaches 180 degrees. As described above, the connection point A is fixed by the first coupling member 46 attached to the hole 34, and the moving direction of the connection point C is regulated only in the axial direction by the second coupling member 47 attached to the long hole 35. Thus, the spring 44 moves to the side of the flange 11, and the flange 11 moves to the side of the ESI probe 211.

In the meantime, the inlet-side piping 211a of the ESI probe 211 enters the tapered through-hole 14 of the adapter 10 and advances in the inside of the through-hole 14 little by little. The end face of the inlet-side piping 211a of the ESI probe 211 passes through the through-hole 14, and abuts on the end face of the outlet-side flow path 113c of the column 113 and the piping abutment surface 113e in the connection space 113d in the connection unit 113a of the column 113. When the arm 41 is further tilted from this state, the end face of the inlet-side piping 211a of the ESI probe 211 is pushed by the piping abutment surface 113e, and the ESI probe 211 retracts. When the ESI probe 211 retracts by a predetermined distance, the end of the probe fixture 20 comes into contact with the inner wall surface of the housing 30 to restrict the movement of the ESI probe 211. The force by which the end face of the outlet-side flow path of the column 113 pushes the end face of the inlet-side flow path of the ESI probe 211 gradually increases, and the both are connected to each other in the face abutment manner. Meanwhile, the spring 44 is gradually contracted. The disposition of each unit at this time is as illustrated in FIG. 9B and FIG. 10B.

As illustrated in FIGS. 9B and 10B, when the arm 41 is further tilted from the state in which the first connection member 42 and the second connection member 43 are located on a straight line, bending directions of the first connection member 42 and the second connection member 43 are reversed, the connection point B moves further downward, and the contracted spring 44 is restored. In the embodiment, this state (the state in FIGS. 9C and 10C) is achieved by tilting the arm 41 until one side (the side on the side to which the first connection member 42 is not connected) of the L-shaped arm 41 becomes horizontal, and the connection state between the outlet-side flow path of the column 113 and the inlet-side flow path of the ESI probe 211 is locked.

The state in FIGS. 9B and 10B is the state in which the spring 44 is contracted to the maximum, and force that restores the spring 44 works when force is applied to any member from the outside, and the connection point B easily moves upward or downward. At this point, the connection between the outlet-side flow path 113c of the column 113 and the inlet-side flow path of the ESI probe 211 is released when the connection point B moves upward to return to the direction in FIGS. 9A and 10A. In the embodiment, the arm 41 is pushed into the state in FIGS. 9C and 10C. At this point, a transition to the state in FIGS. 9B and 10B is not made unless the user operates the handle to apply the force that contracts the spring 44, and the connection state between the outlet-side flow path 113c of the column 113 and the inlet-side flow path of the ESI probe 211 are maintained.

As illustrated in FIG. 8, in the embodiment, by performing the above operation, while the outlet-side flow path 113c of the column 113 and the inlet-side piping 211a of the ESI probe 211 communicate with each other, the end faces of the flow paths are connected to each other in the face abutment manner at the piping abutment surface 113e, and a connection state in which the dead volume of the connection portion is minimized is obtained.

In the liquid chromatograph of the embodiment, the column 113 connected to the ESI probe 211 of the mass spectrometer 200 is fixed to the adapter 10 of the ionization probe connection jig 1, and attached to the housing 30. The housing 30 is accommodated in the column oven 114 so as to be movable in the axial direction. That is, a guide mechanism that is provided in the column oven 114, permits the column 113 to move in a predetermined direction (axial direction) following the movement of the ionization probe 211, and regulates the movement in other directions is materialized by accommodating the housing 30 to which the column 113 is fixed in the recess 1141a of the column oven main body 1141.

In the conventional liquid chromatograph, when the ESI probe is moved, the heavy column oven is pulled via the inlet-side piping of the ESI probe and column (that is, the column oven moves as the ESI probe moves), sometimes the inlet-side piping of the ESI probe and the column are damaged by a large force, or the connection between the inlet-side piping and the column fails. In particular, when the length of the inlet-side piping of the ESI probe is required to be minimized in the nano ESI or the micro ESI, the above problem markedly occurs even when the adjustment range is small, because there exists little allowance that the piping can absorb the force during the movement of the ESI probe. Even if the ESI probe and the column are integrally formed, the column oven is pulled by the column integrated with the ESI probe when the position of the ESI probe is adjusted, and sometimes the column is damaged. In the liquid chromatograph of the embodiment, only the column 113 and the ionization probe connection jig 1 (part of the guide mechanism) move along with the ESI probe 211 when the disposition of the ESI probe 211 is adjusted, but the column oven 114 that is heavy object does not move, so that a possibility of the above problem is greatly reduced.

In the liquid chromatograph of the embodiment, the moving direction of the housing 30 (and the column 113 held in the housing) is limited only to the axial direction, so that generation of an undesired vibration is prevented in the column 113 even if vibration or the like of the pump 111 is generated. In the conventional liquid chromatograph, it is necessary to provide the space allowing the movement of the column oven that is a larger than the ESI probe or the column in the inside of the apparatus or the column oven installation space (the case where the column oven is provided independently of another component of the liquid chromatograph). In contrast, it is not necessary to provide such a space in the liquid chromatograph of the embodiment, and the apparatus can be made smaller than before.

In the ionization probe connection jig 1 used as a part of the guide mechanism in the embodiment, the user can easily connect the outlet-side flow path of the column 113 and the inlet-side channel 211a of the ESI probe 211 only by operating the handle attached to the arm 41 of the pressing mechanism 40. In the ionization probe connection jig 1 of the embodiment, the through-hole 14 is made in order to insert the inlet-side piping 211a of the ESI probe 211 into the adapter 10, and the through-hole 14 has the tapered shape. For this reason, when the inlet-side piping 211a of the ESI probe 211 is inserted, the inlet-side flow path of the ESI probe 211 is precisely aligned to the outlet-side flow path 113c of the column 113 in the through-hole 14, so that the worry about the generation of the liquid leakage is eliminated.

A configuration in which the operation member 15 rotatably holds the disk-shaped flange 11 is adopted in the embodiment. For this reason, after the adapter 10 is set in the adapter accommodating unit 311, the flange 11 can be rotated to eliminate the twist of the piping connected to the inlet side of the column 113. Additionally, the user can set the adapter 10 in the adapter accommodating unit 311 while taking the operation member 15, so that the user can safely and easily attach the adapter 10 without touching with the column oven or the like.

In the embodiment, the pressing mechanism 40 of the ionization probe connection jig 1 includes the spring 44 that contracts in the axial direction. For this reason, even if the user applies the large force to the handle to apply the excessive force to the arm 41, part of the force can be absorbed by the elasticity of the spring 44 to prevent the damage of the column 113 or the inlet-side piping 211a of the ESI probe 211. The length (that is, the length L1, L2 of the connection space 113d in FIGS. 3A and 3B) of the piping protruding from the outlet of the column 113 varies depending on the type of the column 113. However, the use of the pressing mechanism 40 having the configuration including the spring 44 adjusts an entry amount of the inlet-side piping 211a of the ESI probe 211 into the through-hole 14 (that is, the connection space 113d of the connection unit 113a of the column 113), so that the difference in the shape of the connection unit 113a in each column 113 can be absorbed to certainly performs the face abutment of the outlet-side end face of the column 113 and the inlet-side end face of the ESI probe 211.

The force required to apply a certain pressure (surface pressure) at the face abutment connection portion between the column 113 and the ESI probe 211 is proportional to an abutment area of the column 113 and the ESI probe 211. In the embodiment, because the end of the inlet-side piping 211a of the ESI probe 211 is tapered, the area abutting on the end face on the outlet side of the column 113 is reduced, and the force required to apply the surface pressure is decreased. Thus, the spring 44 having a small spring constant can be used such that even a powerless person easily connect the outlet-side end face of the column 113 and the inlet-side end face of the ESI probe 211 in the face abutment manner. Because the end of the inlet-side piping 211a of the ESI probe 211 is tapered, the force applied to the arm 41 is dispersed to prevent deformation and breakage of the end of the inlet-side piping 211a of the ESI probe 211, and the durability can be increased.

The above embodiment is merely a preferable example, and a change can appropriately be made according to the spirit of the present invention.

In the above embodiment, the adapter 10 is fixed to the end on the outlet side of the column 113. Alternatively, the adapter 10 may be fixed to the inlet side or the main body of the column 113. However, in that case, the force applied to the arm 41 is transmitted to the connection portion with the ESI probe 211 through the main body of column 113. For this reason, it is necessary to carefully apply the force during use of the column 113, such as a capillary column, which is easily damaged. Thus, preferably the adapter 10 is attached to the end (connecting unit 113a) on the outlet side of the column 113 as in the above embodiment. In this case, because the force applied to the arm 41 is transmitted to the connection portion with the ESI probe 211 with no use of the main body of the column 113, a particularly careful operation is not required even if the capillary column or the like is used.

In the above embodiment, the ionization probe connection jig 1 having the above configuration is used as the guide mechanism. Alternatively, more simply the ionization probe connection jig 1 may have a configuration in which a column holder holding the column and a recess that is formed in the column oven and is larger than the column holder in a predetermined direction are combined or a configuration in which the column holder and a guide rail that guides the moving direction of the column holder in one direction are provided.

The column can be moved in a plurality of directions. For example, for the above embodiment, the recess 1141a of the column oven body 1141 may be longer than the housing 30 in one direction except for the axial direction. In this case, preferably a guide rail is provided so as to guide the movement of the housing 30 in each of the axial direction and one direction except for the axial direction.

In the ionization probe connection jig 1 used in the above embodiment, the connection point A is located below the column 113. Alternatively, the connection point A may be set to the same height as that of the column 113. Hereinafter, such modifications will be described with reference to FIGS. 11 to 13C.

Figure 11:
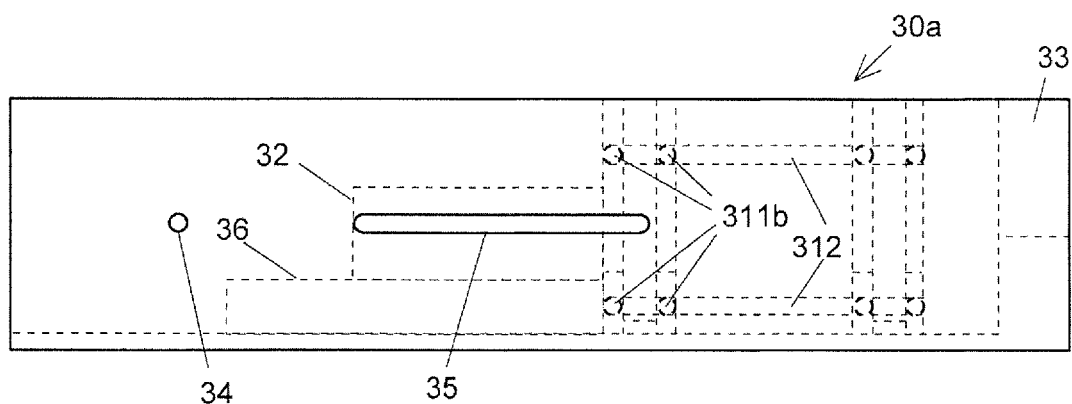
FIG. 11 is a side view illustrating a casing according to a modification.
Figure 12:
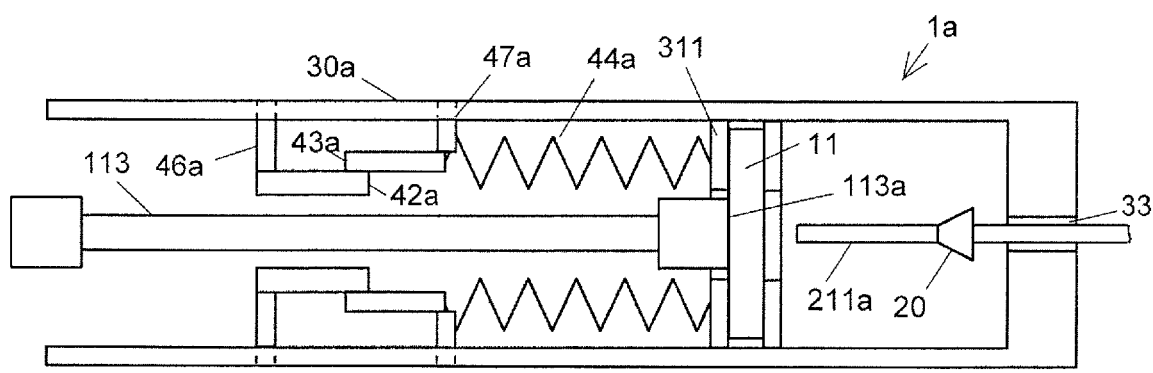
FIG. 12 is a view illustrating the arrangement of components of an ionization probe connection jig according to the modification.

FIG. 11 is a view (a view corresponding to FIG. 6B) illustrating a housing 30a of an ionization probe connection jig 1a according to the modification as seen from the side surface. FIG. 12 is a view (a view corresponding to FIG. 9A) illustrating the disposition of components of the ionization probe connection jig 1a of the modification. In the modification, a hole 34a and a long hole 35 are made at the same height (the same height as the column).

Figure 13A:
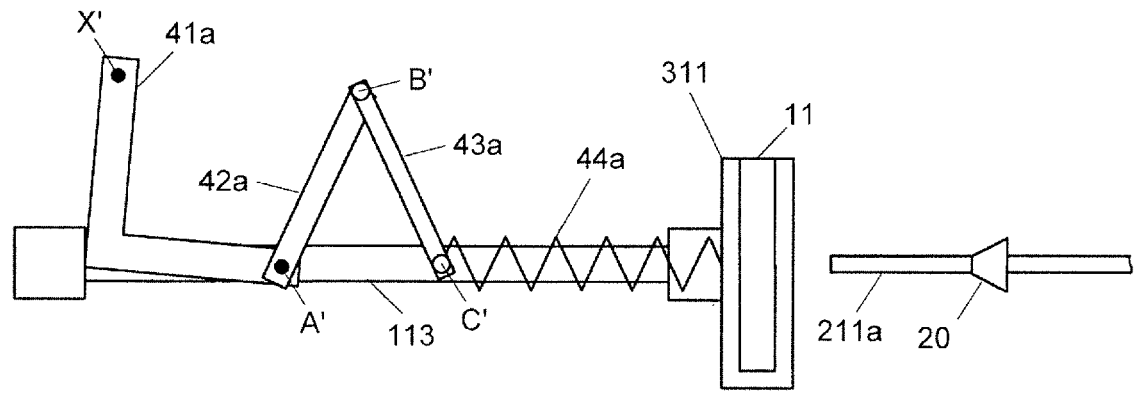
FIGS. 13A to 13C are views illustrating the operation procedure of the ionization probe connection jig of the modification.
Figure 13B:
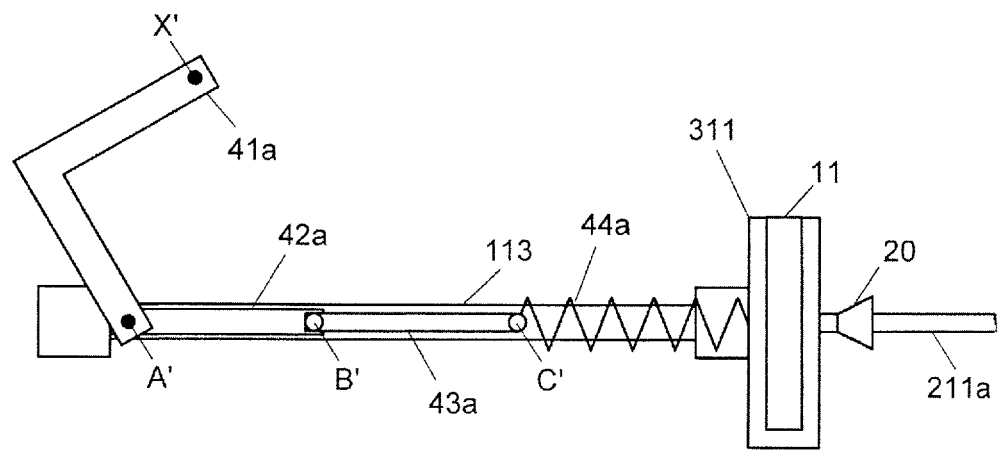
Figure 13C:
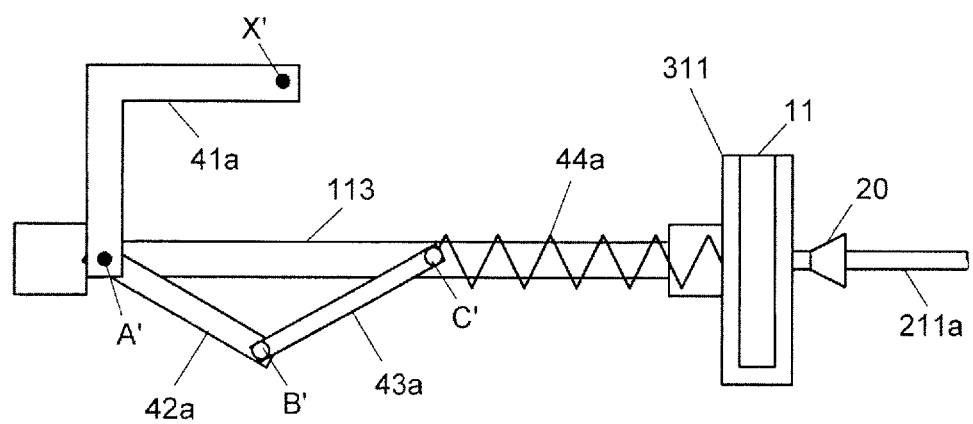

FIGS. 13A to 13C are views (views corresponding to FIGS. 10A to 10C) illustrating operation of a pressing mechanism 40a of the modification. In the above embodiment, the connection point A is fixed at the position lower than the column 113. On the other hand, in the modification, a connection point A' is the same height as the column 113, and is fixed to a first coupling member 46a at that position. However, unlike the above embodiment, the first coupling member 46a is provided for each connection point A' between an arm 41a and a first connection member 42a (two in total), and is fixed to the hole 34a. In the above embodiment, the two arms 41 are coupled together by the first coupling member 46 at the connection point A located lower than the column 113, and the handle is provided at the end of one arm 41. In the modification, the connection point A' is located at the same height as the column 113, and the two arms 41a cannot be coupled together at this position. Therefore, in the modification, the two arms 41a are connected by a third coupling member (not illustrated) at the connection point X', and this is also used as a handle. The positions of the connection point C and a second coupling member 47a are the same as those of the above embodiment. In the modification, the operation procedure of the pressing mechanism 40a is the same as that of the above embodiment. That is, the handle is operated to tilt the arm 41a until the first connection member 42a and the second connection member 43a are located on the straight line, the outlet-side flow path of the column 113 and the inlet-side piping 211a of the ESI probe 211 are connected to each other by press-fitting, and the connection state between the outlet-side flow path of the column 113 and the inlet-side piping 211a of the ESI probe 211 is locked by further tilting the arm 41a.

In the above embodiment, the liquid chromatograph mass spectrometer is described as an example. However, the present invention can also be used in a liquid chromatograph having an ion mobility analyzer or a classifier as the detector instead of the mass spectrometer.

In the above embodiment, the ESI probe is taken as an example. However the same configuration can be adopted when another ionization probe such as an APCI probe is connected.

Figure 14:
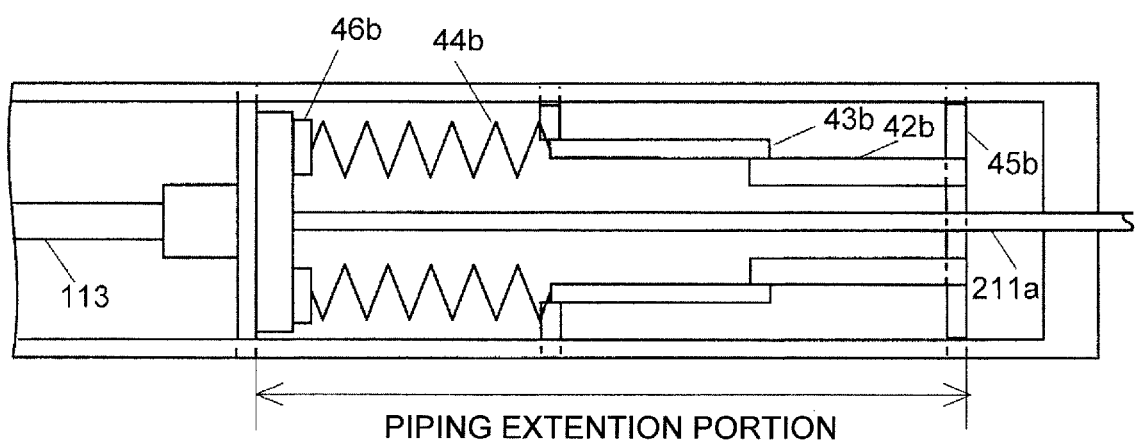
FIG. 14 is a view illustrating the arrangement of components of a pressing mechanism in an ionization probe connection jig according to another modification.

In the above embodiment, the adapter 10 is permitted to advance in the axial direction of the column 113 while the adapter 10 and the probe fixture 20 are regulated such that the flow paths of the column 113 and the ESI probe 211 are matched with each other, and the probe fixture 20 restricts the ESI probe 211 such that the ESI probe 211 does not retreat beyond the predetermined position in the axial direction. Alternatively, as illustrated in FIG. 14, the ESI probe 211 may be permitted to advance in the axial direction (that is, advance in the direction toward the column 113) while the column 113 and the ESI probe 211 are regulated such that the flow paths of the column 113 and the ESI probe 211 are matched with each other, the column 113 may be restricted so as not to retreat beyond the predetermined position in the axial direction. In FIGS. 13A to 13C, the elements corresponding to the elements of the pressing mechanism 40 of the above embodiment are represented by the same reference numerals (42b and the like), and the reference numerals of the elements except for the column 113 and the inlet-side piping 211a of the ESI probe are omitted. Even with this configuration, although the same effect as the configuration of the above embodiment can be obtained in that the outlet-side flow path of the column 113 and the inlet-side flow path of the ESI probe 211 can be connected to each other without generating the dead volume, the length of the inlet-side piping 211*a* of the ESI probe 211 is lengthened by the length of the pressing mechanism 40 (piping extension portion in FIG. 14), and the components contained in the eluate are more easily diffused by the length of the pressing mechanism 40. Thus, the configuration of the above embodiment, namely, the configuration that permits the column 113 to advance in the axial direction of the column 113 while restricting the probe fixture 20 such that the probe fixture 20 does not retreat beyond the predetermined position in the axial direction of the ESI probe 211 is more preferable. In the configuration of the above embodiment, the diffusion of components in the eluate can be suppressed to the minimum by minimizing the length of the connection portion between the outlet-side flow path of the column 113 and the inlet-side flow path of the ESI probe 211 and the piping length of the ESI probe 211.

The shapes and the number of units described in the above embodiment and the modification are merely examples, and the shapes and the number of units can be changed as appropriate according to the configuration of the apparatus to be used, the usage environment, and the like.

REFERENCE SIGNS LIST 1, 1*a* . . . Ionization probe connection jig
10 . . . Adapter
11 . . . Flange
11*a* . . . Pressable region
12 . . . Column fixation section
13 . . . Probe connection unit
14 . . . Through-hole
15 . . . Operation member
151 . . . Handle
152 . . . Ring
153 . . . Protrusion
16 . . . Recess
20 . . . Probe fixture
30, 30*a* . . . Housing
31 . . . Adapter attaching unit
311 . . . Adapter accommodating unit
311*a* . . . Slot
311*b* . . . Protrusion
311*c* . . . Recess
312 . . . Adapter accommodating unit holder
32 . . . Pressing mechanism accommodating unit
33 . . . Ionization probe accommodating unit
36 . . . Column mounting unit
40, 40*a*, 40*b* . . . Pressing mechanism
41, 41*a* . . . Arm
42, 42*a* . . . First connection member
43, 43*a* . . . Second connection member
44, 44*a* . . . Spring
45 . . . Pressing unit
46, 46*a* . . . First coupling member
47, 47*a* . . . Second coupling member
113 . . . Column
113*a* . . . Connection unit
113*b* . . . Thread
113*c* . . . Outlet-side flow path
113*d* . . . Connection space
113*e* . . . Piping abutment surface
114 . . . Column oven
1141 . . . Column oven body
1141*a* . . . Recess
1141*b* . . . Ionization probe accommodating unit
1141*c* . . . Screw hole
1142 . . . Lid
211 . . . ESI probe
211*a* . . . Inlet-side piping

The invention claimed is:

1. A liquid chromatograph configured to ionize a sample eluted from a column using an ionization probe connected to the column and to analyze the sample using an ion analyzer, the liquid chromatograph comprising:
   a) a column oven in which the column is accommodated; and
   b) a guide mechanism provided inside the column oven, and configured to allow the column to move in a predetermined direction following movement of the ionization probe, to restrict movement in other directions.

2. The liquid chromatograph according to claim 1, wherein the guide mechanism includes a column holder configured to hold the column and a recess that is formed in the column oven and is longer than an outer diameter of the column holder in the predetermined direction.

3. The liquid chromatograph according to claim 2, further comprising an ionization probe fixture fixed to the ionization probe,
   wherein the column holder comprises:
   a column fixture fixed to the column; and
   a movement restricting tool configured to allow the column fixture to advance in an axial direction of the column while restricting the column or the column fixture and the ionization probe or the ionization probe fixture such that flow paths of the column and the ionization probe are matched with each other, and restrict the ionization probe fixture such that the ionization probe fixture does not retreat beyond a predetermined position in an axial direction of the ionization probe.

4. The liquid chromatograph according to claim 3, wherein the column fixture is fixed to an end on an outlet side of the column.

* * * * *